United States Patent
Shepard

(10) Patent No.: US 6,582,631 B1
(45) Date of Patent: Jun. 24, 2003

(54) METHOD FOR CAST MOLDING CONTACT LENSES

(75) Inventor: Thomas Shepard, Buford, GA (US)

(73) Assignee: Novartis AG, Basel (CH)

( * ) Notice: Subject to any disclaimer, the term of this patent is extended or adjusted under 35 U.S.C. 154(b) by 228 days.

(21) Appl. No.: 09/710,514

(22) Filed: Nov. 9, 2000

Related U.S. Application Data

(60) Provisional application No. 60/164,345, filed on Nov. 9, 1999.

(51) Int. Cl.[7] ............................................. B29D 11/00
(52) U.S. Cl. ....................................... 264/2.5; 425/808
(58) Field of Search ................... 264/1.1, 2.5; 425/808

(56) References Cited

U.S. PATENT DOCUMENTS 4,208,364 A * 6/1980 Shepherd .................. 264/2.2
5,843,346 A * 12/1998 Morrill ....................... 425/808

FOREIGN PATENT DOCUMENTS

JP        11-116718       *   4/1999

* cited by examiner

*Primary Examiner*—Mathieu D. Vargot
(74) *Attorney, Agent, or Firm*—R. Scott Meece; Jian Zhou; Richard Gearhart

(57) ABSTRACT

An improved method of cast molding contact lenses, wherein a lens forming mixture is cured in the lens-shaped cavity formed between molding surfaces of a male and female mold sections, wherein the improvement comprises at least one of sections is injection molded from a metallocene-catalyzed thermoplastic polyolefin.

2 Claims, No Drawings

METHOD FOR CAST MOLDING CONTACT LENSES

This application claims the benefit of Ser. No. 60/164,345, filed Nov. 9, 1999.

BACKGROUND OF THE PRESENT INVENTION

1. Field of the Invention

The present invention relates to improvements in cast molding of contact lenses.

2. Background Art

Contact lenses are increasingly manufactured by cast molding, rather than by lathing, or by other processes. Cast molding has the advantages of reproducibility, speed, flexibility, and economy. In general, molded lenses are formed by depositing a curable liquid, such as a polymerizable monomer into a mold cavity, curing the liquid into a solid state, opening the mold cavity, and removing the lens. Other processing steps, for example, hydration, may be performed.

Various materials have been proposed for use in forming the molds. The most common method of formation of the mold is injection molding of either a polyolefin (i.e., polypropylene) or polystyrene. However, various problems have been associated with injection molding of such materials. For example, many grades of polypropylene exhibit poor processibility; while others, although having excellent processibility, result in an unsatisfactory mold due to surface distortions and the like.

It has generally been understood in the art that polyolefin polymers having a broad molecular weigh distribution (high polydispersity index) allow high processing speeds while improving surface properties. See, e.g., WO 94/12568 and references cited therein. It was observed in the art that surface quality of final products decreased as the polydispersity of the polyolefin blend increased. This was assumed to be a result of the diffusion of low molecular weight species and filling of microscopic voids produced so as to prevent cavitation. However, through the use of polyolefin blends of this type, performance, flexibility and consistency are sometimes sacrificed.

Therefore, there exists a need in the art for an improved method of cast molding contact lenses with molds formed from materials that allow fast and economical processing of the molds and provide consistently superior qualities in the molded lenses.

SUMMARY OF THE INVENTION

According, the present invention provides an improved method of cast molding contact lenses, wherein a lens forming mixture is cured in the lens-shaped cavity formed between molding surfaces of a male and female mold sections, wherein the improvement comprises at least one of sections is injection molded from a metallocene-catalyzed thermoplastic polyolefin.

DETAILED DESCRIPTION OF THE PREFERRED EMBODIMENT

In the present mold, the male and female sections combine to form a mold assembly, where in the male section detachably combines with the female section. When combined, the inside surfaces of the two sections form a mold cavity between the two surfaces that define the shape of the contact lenses. Those skilled in the art will recognize that the surfaces will define the optics and peripheral curves desired in the contact lens.

In the process of the present invention, a lens forming mixture is deposited into the female section of the mold. The mold is then assembled, by inserting the male section into the female sections of the mold. The lens forming mixture is polymerized in the lens-shaped cavity formed between molding surfaces of a male and female mold sections by exposure to UV light and/or heat. After the lens if formed, the mold is disassembled and the lens removed. Those skilled in the art will recognize that additional processing steps, such as sterilization, hydration, inspection, and surface treatment may then be performed on the lens.

The lenses cast molded by the method of the present invention include both soft contact lenses, and rigid, gas permeable lenses (RGP). Representative RGP materials are disclosed in U.S. Pat. Nos. 4,152,508; 3,808,178; 4,686,267; and 4,780,515. Soft contact lenses have been traditionally formed from polymers and copolymers of 2-hydroxyethyl methacrylate (HEMA). More recently, siloxane-containing macromers have been developed and lenses formed from such materials are now becoming commercially available. Those skilled in the art will recognize other materials suitable for use in the method of the present invention.

According to the invention, at least one of the male and female mold sections is injection molded from a metallocene-catalyzed thermoplastic polyolefin resin. According to the preferred embodiment, both mold sections are molded from this class of resins.

Metallocene polymers are produced through the metallocene process and have properties different than those produced through traditional Ziegler-Natta and other systems. Such metallocene-catalyzed systems and polymers are disclosed in e.g., U.S. Pat. Nos. 4,530,914 and 5,846,896. Although based on transition metals such as titanium and zirconium—as are Ziegler-Natta catalysts—metallocenes differ in that they have well-defined single catalytic sites and produce a single type of polymer chain. Typically, they consist of a transition-metal atom sandwiched between ring structures to form a sterically hindered site. The preferred metallocenes are commercially available from Exxon Corp. under the trade names EXXPOL® and ACHIEVE™ for polypropylene based polymers and EXACT® and EXCEED™ for polyethylene based polymers. Dow Chemical Company of Midland, Mich. has polymers commercially available under the name ENGAGE®. These materials are believed to be produced using non-stereo selective metallocene catalysts. Exxon generally refers to their metallocene catalyst technology as "single site" catalysts while Dow refers to theirs as "constrained geometry" catalysts under the name INSITE® to distinguish them from traditional Ziegler-Natta catalysts which have multiple reaction sites. Other manufacturers such as Fina Oil, BASF, Amoco, Hoechst and Mobil are active in this area and it is believed that the availability of polymers produced according to this technology will grow substantially in the next decade. In the practice of the instant invention, polyolefins like polypropylene and polyethylene are suitable.

The primary feature that makes metallocene-catalyzed polymers preferable to conventional polymers is structural uniformity. This feature eliminates very low and very high molecular weigh polymer components present in polymers catalyzed with conventional catalysts. As a result of this uniformity, the polymers exhibit narrow molecular weight distribution (MWD), narrow composition distribution, and narrow tacticity distribution.

MWD refers to the breadth of variation in the length of molecules in a given polymer or resin. The broader the variation, the broader the molecular weight distribution. While it has been known that a narrow MWD improves puncture, tensile, and impact performance, it was thought to increase surface defects in finished products. Contrary to the teachings of the prior art, Applicant has found that metallocene-catalyzed polymers result in excellent processability and surface quality despite the narrow molecular weight distribution.

Composition distribution refers to the amount of comonomer in each individual polymer chain. More narrow composition distribution results in better clarity and sealing performance. Tacticity distribution refers to the amount of a tactic polymer present. Commercial isotactic polypropylene is made from conventional catalysts is actually a mixture of isotactic and atactic polypropylene. This mixture is known as a broad tacticity distribution rein. The presence of atactic polypropylene reduces desirable qualities such as stiffness, heat distortion temperature and cleanliness. By contrast, isotactic polypropylene made from metallocene catalysts contains no atactic polypropylene. Metallocene isotactic polypropylene has a higher stiffness and use temperature than similar molecular weight isotactic polypropylene made from conventional catalysts.

The absence of atactic polypropylene also means that metallocene isotactic polypropylene has a lower extractable content, resulting in cleaner resins The mold sections may be injection molded from the thermoplastic polyolefin resin by methods which are otherwise known in the art. One skilled in the art will recognize methods and processing conditions best suited for formation of the molds. A desired surface is machined and polished on the tools to achieve precision surface quality so that no surface imperfections are transferred to the mold section being injection molded therefrom.

Although certain preferred embodiments of the invention have been described, it is understood that the invention is not limited thereto and modifications and variations would be evidence to a person of ordinary skill in the art.

I claim:

1. An improved method of cast molding contact lenses, wherein a lens forming mixture is cured in the lens-shaped cavity formed between molding surfaces of a male and female mold sections, wherein the improvement comprises at least one of sections is injection molded from a metallocene-catalyzed thermoplastic polyolefin having narrow molecular weight distribution, narrow composition distribution and narrow tacticity distribution.

2. The improved method of claim 1, wherein the female section is injection molded from a metallocene-catalyzed thermoplastic polyolefin having narrow molecular weight distribution, narrow composition distribution and narrow tacticity distribution.

* * * * *